March 8, 1966 C. M. GOBHAI 3,239,143
FLUID LOGIC HALF ADDER-SUBTRACTOR
Filed June 24, 1964 2 Sheets-Sheet 1
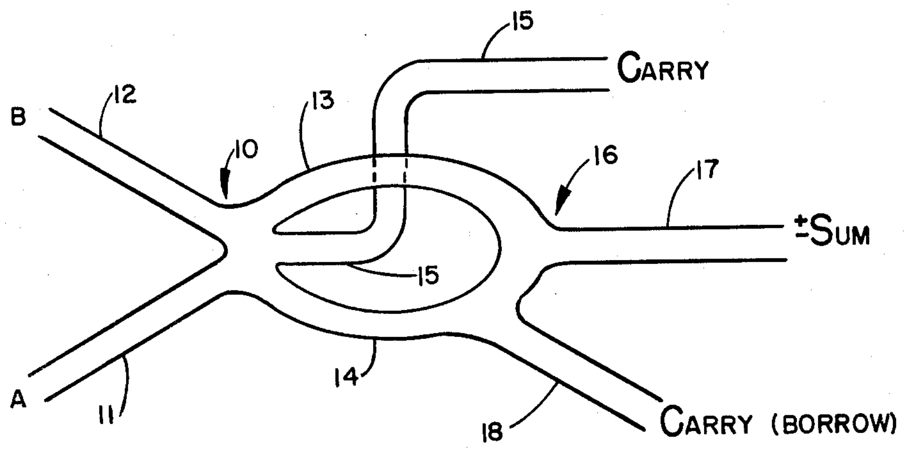
FIGURE I
| TRUTH TABLE | | | | |
|---|---|---|---|---|
| HALF ADDER-SUBTRACTOR | | | | |
| A | B | ±S | +C | -C |
| 0 | 0 | 0 | 0 | 0 |
| 0 | 1 | 1 | 0 | 1 |
| 1 | 0 | 1 | 0 | 0 |
| 1 | 1 | 0 | 1 | 0 |
FIGURE II
INVENTOR.
CAVAS M. GOBHAI
BY Lawrence H. Patton
AGENT

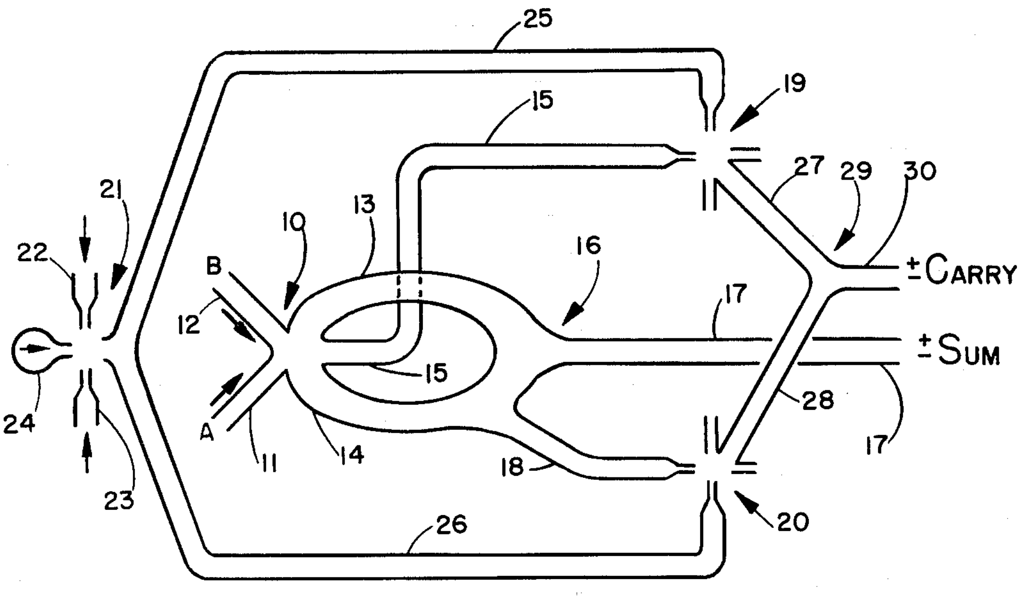
FIGURE III
| TRUTH TABLES | | | | | | | |
|---|---|---|---|---|---|---|---|
| HALF ADDER | | | | HALF SUBTRACTOR | | | |
| A | B | $+S^{1}/_{2}$ | $+C^{1}/_{2}$ | A | B | $-S^{1}/_{2}$ | $-C^{1}/_{2}$ |
| 0 | 0 | 0 | 0 | 0 | 0 | 0 | 0 |
| 0 | 1 | 1 | 0 | 0 | 1 | 1 | 1 |
| 1 | 0 | 1 | 0 | 1 | 0 | 1 | 0 |
| 1 | 1 | 0 | 1 | 1 | 1 | 0 | 0 |
FIGURE IV
INVENTOR.
CAVAS M. GOBHAI
BY Lawrence H. Paeton
AGENT 3,239,143
FLUID LOGIC HALF ADDER-SUBTRACTOR

Cavas M. Gobhai, Cambridge, Mass., assignor to The Foxboro Company, Foxboro, Mass., a corporation of Massachusetts Filed June 24, 1964, Ser. No. 377,703
1 Claim. (Cl. 235—201)

This invention relates to fluid logic devices and in particular provides an arithmetic system on a binary basis.

A half adder is one which provides a Sum without using the Plus Carry except for indication. A half substractor is one which provides a Minus Sum without using the Minus Carry (Borrow) except as an indication.

This is a dynamic fluid device on a continuous flow basis.

This device provides a compact, simple fluid device with no moving parts, wherein a single bit of a pair of binary numbers may be added or subtracted in a combination system. This may be accomplished in one form by reading out certain outputs for addition and reading out other outputs for subtraction, with a common base for both functions. Another form of the device provides the use of an input signal to establish whether the digits are to be substracted or added, in reading out of the same outputs for both.

This invention therefore provides a new and useful fluid logic device in the form of an arithmetic binary half adder-subtractor combination.

Other objects and advantages of this invention will be in part apparent and in part pointed out hereinafter and in the accompanying drawings, wherein:

FIGURE I is a schematic showing of one form of this invention with a common Sum output readable in conjunction with another output for addition Carry, and readable in conjunction with a third output for subtraction Carry (Borrow);

FIGURE II is a truth table in explanation of the operations of the system of FIGURE I;

FIGURE III is another form of this system according to this invention wherein a pair of outputs is read in either case and input signals are prodived to determine whether the output reading is subtraction or addition; and FIGURE IX is a truth table showing of the half adder-subtractor combination system of FIGURE III.

In the FIGURE I system a passive fluid logic unit 10 is provided with a crossroads system of passages wherein one signal, A, is introduced through an input passage 11, and second signal, B, is introduced through a second input passage 12. When uninterrupted the signal through input passage 11 crosses the passive area 10 directly into an output passage 13. Similarly a signal in the input passage 12, when uninterrupted, crosses the passive area 10 into an output passage 14.

When there is a signal both in input passages 11 and 12 as when the digits being added or subtracted are both (1), they physically meet in the central area of the passage unit 10 and deflect each other so that both exit from the device through a third output passage 16 with little or no signal in the other passages 13 or 14. The output passages 13 and 14 meet downstream at a juncture 16 and continue in a single outlet 17 therefrom. From the passage 14 between the passive area 10 and the juncture 16 there is provided a branch passage 18.

In accordance of this system the central final outlet passage 17 provides the Sum of the digits introduced as A and B, the common output passage 15 has therein the Plus Carry signal of an addition function, and the branch 18 has therein the signal for the Minus Carry (Borrow) of the subtraction function.

Thus with A as a signal in the passage 11 and no signal B in the passage 12, the A signal will proceed through the passage 11, past the passive area 10, and into the output area 13 to terminate as a signal in the common Sum outlet passage 17. Given a signal B in the input passage 12 and 0 signal in A input passage 11, the signal B will traverse the input passage 12, across the passive area 10, and into the output passage 14 to provide a signal both in the common output Sum passage 17 and in the branch outlet 18.

When both A and B have signals therein they meet in the area 10 and proceed together through the outlet 15. When neither A nor B have a signal, that is both are 0, the Sum signal in the passage 17 is 0, and there is a 0 signal in the carry passage 15 and the Minus Carry passage 18.

In reading out this device for addition, the Sum output in the passage 17 is considered with the Plus Carry, if any, in the passage 15. For subtraction the Sum in the output 17 is considered with the Minus Carry (Borrow) in the branch output 18. Thus with the same unit, and with the Sum being identical whether it is addition or subtraction, consideration of the Sum and the Plus or Minus Carries will provide readings of addition or subtraction as desired.

The truth table of FIGURE II shows the A and B input signals with Plus or Minus Sum, the Sum being the same in either case, the Plus Carry for addition, and the Minus Carry for subtraction. Thus with this system a simple arrangement of half adder-half subtractor is provided.

The structure of FIGURE III has portions thereof like that of FIGURE I and like reference numerals are applied to like portions thereof. The structure of FIGURE III operates in the same fashion as that of FIGURE I except that it had additional functions, advantages, and structure for a different form of half adder-subtractor.

In FIGURE III, in addition to the passive unit 10 with its input passages 11 and 12, its output passages 13, 14 and 15, the downstream Summer passage 16 with its outlet single passage 17, there is provided secondary passive units as at 19 and 20 in the form "and" devices.

At the left of the drawing there is shown an introductory unit in the form of fluid logic flip flop 21. This is arranged for pulse operation through a control passage 22 for subtraction, and through a control passage 23 for addition. This unit has a power source as at 24 and two outlet passages 25 and 26.

The passive element 19, therefore, has for its two input signals, the signal from the common output passage 15 of the passive unit 10, and the signal in the output 25 from the flip flop unit 21. Similarly the passive area unit 20 has two inputs, one from the branch output 18 from the passive unit 10, and the other from the output 26 from the flip flop unit 21.

The passive units 19 and 20 are "and" devices. Thus both the input signals must be on for the outputs to occur through passage 27 in the case of unit 19, and the passage 28 in the case of the unit 20. If either of these input signals for the unit 19 and 20 are not on, the other signals simply go to the vents and there is no positive effect on the output. That is, the output is 0. The two outputs 27 and 28 from the passive units 19 and 20 are provided with a juncture 29, and terminate at a final, single outlet at 30. This outlet is a Plus or Minus Carry for the adder-subtractor unit and the outlet 17 is the Plus or Minus Sum for the combination system.

The basis for the truth table for FIGURE IV is A minus B or A plus B in connection with the application of initiating signals to the flip flop unit 21 of FIGURE III.

When it is desired to accomplish half-addition, a pulse is put into the flip flop 21 through input 23, to provide a signal in the passage 25 and thus prepare the "and" gate 19 for a signal from the passive unit 10 if there is, in fact, one due there. Thereafter, when the signals A and B are applied to the passive unit 10 the addition Sum comes out in the passage 17 and the Carry, if any, in the passage 15, to trigger off the "and" gate passive unit 19, and to thus provide a Carry Signal in the output 27.

In like manner, for half-subtraction of A minus B, a pulse signal is put in the input 22 of the flip flop unit 21, providing an output in passage 26 which prepares the "and" gate 20 for the advent of the Minus Carry signal, if any. Then the signals A and B are applied and the Minus Sum is taken out in the minus passage 17. The minus Carry, if any, is applied through the passage 18 to the "and" gate 20 resulting in a signal in passage 28, because of the interference of the signal in passages 18 and 26. This provides a final outlet signal in passage 30 as a Minus Carry signal on the subtraction basis.

A consideration of the truth tables of the FIGURE IV with respect to the structure FIGURE III illustrates the combination system with a common outlet for the Sum whether it be addition or subtraction, and a common outlet for the Minus Carry (Borrow). This latter common outlet is provided with a signal in accordance with the priming action from the flip flop 21, later triggered by the Plus or Minus Carry action as the case may be.

This invention therefore provides a new and useful fluid logic device or arithmetic binary combination half addition and substraction utilizing a combination of passive units and a fluid logic flip flop.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

A fluid logic combination binary half-adder and half-subtractor comprising a central passive fluid logic device with two output passages individual to two input passages, a third output passage common to said two input passages, a downstream juncture of said two output passages into a single outlet therefor, a branch passage from one of said two output passages prior to said downstream juncture, a pair of secondary passive fluid logic devices, said common output passage connected as one input to one of said secondary passive devices, said branch passage connected as one input to the other of said secondary passive devices, a fluid logic amplifier with a pair of output passages, one connected as a second input to said one of said secondary passive devices and the other connected as a second input to said other of said secondary passive devices, a common output passage from each of said secondary passive devices, and a downstream juncture of said last named common output passages.

References Cited by the Examiner

UNITED STATES PATENTS 3,128,040 4/1964 Norwood ---------- 235—201

OTHER REFERENCES

Hobbs: Fluid Amplification—Logic Elements, Harry Diamond Laboratories, U.S. Army Material Command, March 8, 1963, pages 8 and 20.

Truslove: Fluid Counter, IBM Technical Disclosure Bulletin, vol. 6, No. 3, August 1963, page 24.

Mitchell et al.: Fluid Logic Devices and Circuits, Transactions of the Society of Instrument Technology, February 26, 1963, pp. 4–7.

Wood et al.: Fluid Computers, International Science and Technology, No. 23, pp. 44–52, October 28, 1963.

LOUIS J. CAPOZI, *Primary Examiner.*

LEO SMILOW, *Examiner.*

W. F. BAUER, *Assistant Examiner.*